Nov. 29, 1955      W. H. VATCHER      2,725,463
FOG PENETRATING APPARATUS
Filed Feb. 11, 1952
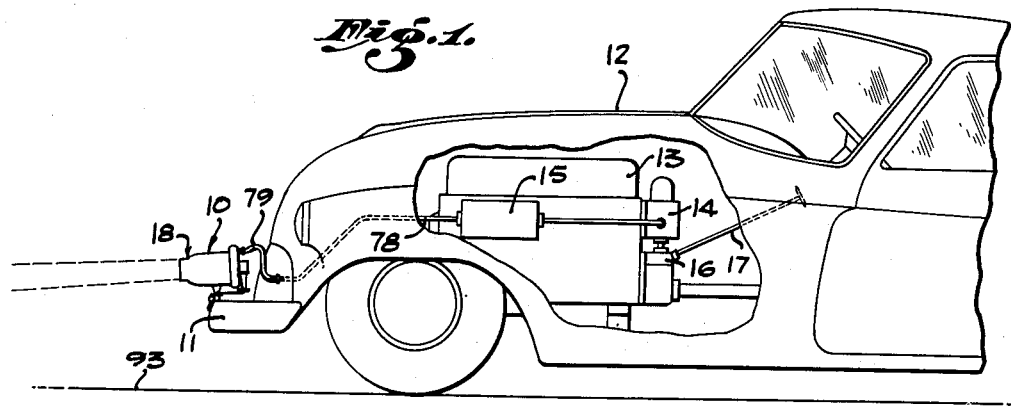
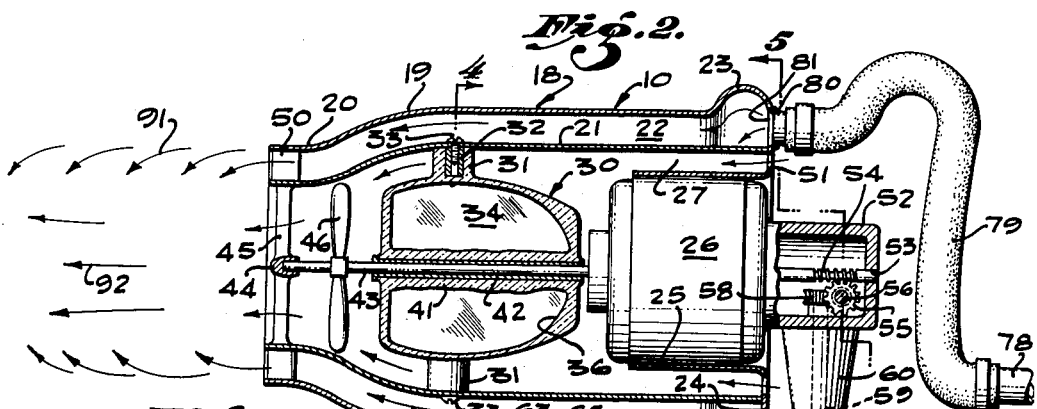
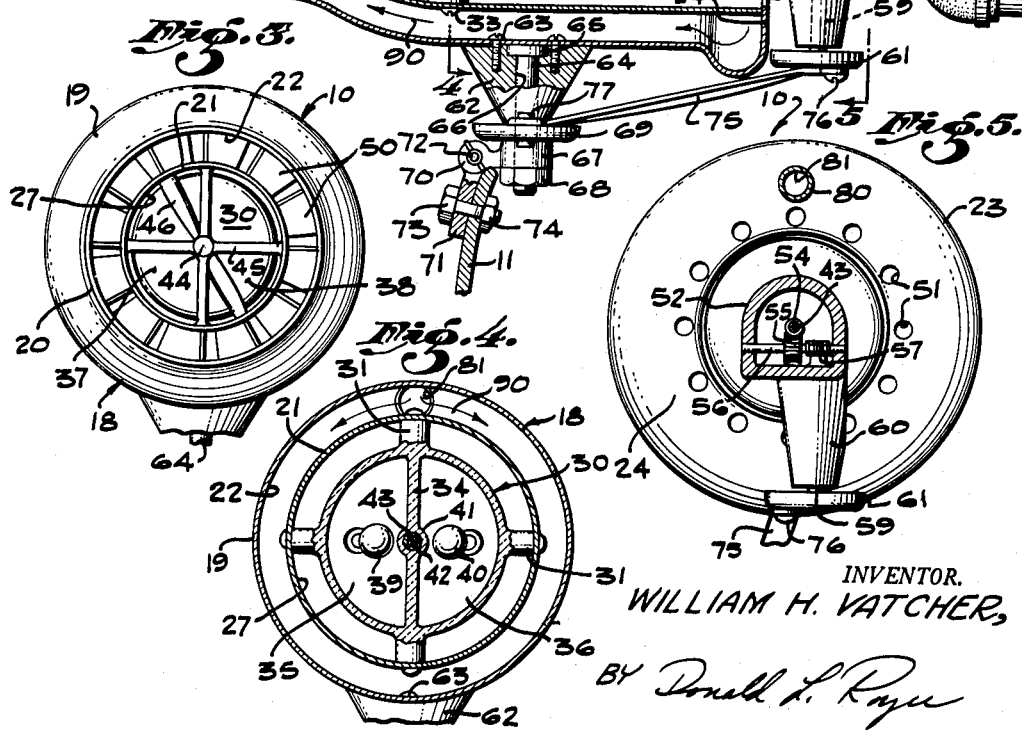
INVENTOR.
WILLIAM H. VATCHER,

United States Patent Office 2,725,463
Patented Nov. 29, 1955

2,725,463
FOG PENETRATING APPARATUS
William H. Vatcher, San Gabriel, Calif.

Application February 11, 1952, Serial No. 270,984

9 Claims. (Cl. 240—7.1)

This invention relates to an apparatus for penetrating fog and more particularly to such an apparatus that is adapted to be mounted on the forward frame or bumper structure of a vehicle.

It has been found that visual penetration and/or disbursement of heavy, calm or static fog is relatively difficult to accomplish with fog lamps and other apparatus heretofore used, as prior devices have relied upon a colored beam of light or like structures, the light beam being merely reflected back to the light source with little or no penetration being effected. It has also been discovered that penetration of fog by white or colored lamps is made relatively more easy if a turbulence or other motion is imparted to static fog. Furthermore, it is well known that intermittent repetitive visual glimpses of difficult to see objects makes such objects more easily discernible.

Apparatus of this type would be particularly adaptable for use in connection with emergency vehicles. However, applicability to private vehicles will also be apparent.

Accordingly, it is an object of the present invention to provide a novel fog penetrating apparatus utilizing the combination of multicolored fog lamps, compressed air for turbulating static fog and simultaneous oscillatory movement of the lamp and air flow.

Another object of the invention is to provide a novel housing, lamp support and motor mounting for a fog penetrating apparatus.

Another object of the invention is to provide a novel means for turbulating static fog.

A further object of the invention is to provide a novel combination of multicolored lamps for use in conjunction with fog turbulating means.

Other and further important objects of the invention will become apparent from the disclosures in the following specification, appended claims and accompanying drawings, wherein;

Fig. 1 is a side elevation view of the fog penetrating apparatus of the present invention showing the apparatus in use and mounted on the forward portion of a vehicle;

Fig. 2 is a detail longitudinal sectional view of the fog penetrating apparatus;

Fig. 3 is a front view of apparatus shown in Fig. 2 and showing the outlets for the dual flow of compressed air;

Fig. 4 is a sectional view taken as indicated by line 4—4 of Fig. 2 and showing the arrangement of the housing structure, concentric ducts and lamp; and Fig. 5 is a view taken as indicated by line 5—5 of Fig. 2 and showing portions of the oscillation mechanism.

Referring to the drawing by reference characters wherein like characters indicate like parts, the fog penetrating apparatus of the present invention is shown and indicated generally at 10. As illustrated in Fig. 1, the apparatus may be mounted on the front bumper 11, or other forward structure, of a vehicle 12 having an engine 13. An engine driven air compressor 14 is mounted adjacent the engine to provide a source of compressed air which may be delivered as shown to an accumulator 15. A clutch 16 is provided intermediate the compressor 14 and the engine 13, operation of which will disconnect the clutch. A clutch actuation lever 17 is operably connected to the clutch 16 and extends into the driver's compartment of the vehicle. Details of such construction are well known and have therefore not been illustrated.

Referring primarily to Fig. 2, the fog penetrating apparatus 10 comprises a housing 18, having an outer annular wall 19 which is reduced in diameter at the forward end 20 thereof. An inner annular wall 21 is coaxially arranged within the wall 19 to thus provide an outer annular duct 22 therebetween. The rearward end of the outer wall 19 is formed into a scroll 23, extends inwardly as at 24 and forwardly as at 25, to provide an annular support for an electric motor 26. The support 25 is radially spaced from the inner wall 21 and the motor 26 to provide an inner annular duct 27 therebetween.

As shown, a fog lamp, indicated generally at 30, is positioned and directed axially within the wall 21. A plurality of integral supports 31 extend from the periphery of the lamp 30 and are provided with inserts 32 for the reception of screws 33 for securing the lamp to the wall 21. The lamp 30 is of the dual compartment type having a central partition 34 (see Fig. 4) which separates a pair of light compartments 35 and 36 which may be of the sealed type having customary lenses 37 and 38 and standard light bulbs 39 and 40. For a purpose which will be later described, the lenses 37 and 38 may be multicolored as, for example, orange and green. The partition 34 has an axial longitudinal enlargement 41 which receives a sleeve bearing 42.

The bearing 42 is adapted to rotatably receive a shaft 43 which extends from and is adapted to be driven by the motor 26. The shaft 43 extends forwardly from the lamp 30 and is journalled in a hub 44 which is axially supported within the forward end of the wall 21 by means of spaced struts 45. A fan 46 having colored transparent blades, is secured to the shaft 43 intermediate the forward end of the lamp 30 and the hub 44. The blades of the fan 46 may, for example, be blue in color for a purpose which will be later described.

Within the forward end of the duct 22, a plurality of spaced swirling vanes 50 are provided, to impart a swirling or turbulating motion to compressed air in passing thereover. The duct 27 has radial entrance openings 51 arranged in the inwardly directed portion 24 of the housing 18.

In order to oscillate the penetrating apparatus, the motor 26 is provided with a rearwardly extending, reduced diameter housing 52 which supports an oscillating mechanism. The shaft 43 extends rearwardly from the motor 26, is journalled in the housing 52, as at 53, and carries a worm 54 which is adapted to drive a worm gear 55. The gear 55 is secured to a shaft 56 which is arranged transversely in and supported by the housing 52. A second worm 57, carried on the shaft 56, is adapted to drive a second worm gear 58. The gear 58 is secured to one end of a shaft 59, this shaft extending downwardly within an extension 60 of the housing 52 and terminating in an enlargement or flange 61.

A boss 62 is secured, as by screws 63, to approximately the balance or mid-longitudinal point of the housing 18 and extends downwardly therefrom. A shaft 64 having an enlarged head 65, is rotatably supported in a bore 66 of the boss 62 and extends downwardly therefrom to support a fixed mounting bracket 67. A nut 68, threadably secured to the lower end of the shaft 64, is adapted to engage the lower end of the bracket 67. The bracket 67 is provided with a flange 69 and an attaching portion 70 which is adjustably secured to a bumper attaching member 71 by means of a wing nut

72. The member 71 is secured to the bumper 11 by means of a bolt 73 and nut 74. The cooperating surfaces of the portion 70 and the member 71 may be serrated in the usual manner in such construction.

As shown in Fig. 2, a link 75 is rotatably secured at one end, as by a screw 76, to the flange 61, at a position spaced from the axis thereof and is secured at the other end, as by a screw 77, to the flange 69, at a position also spaced from the axis thereof. It may thus be seen that rotation of the shaft 59, by the motor 26, through the worms and gears 54, 55, 57 and 58, will rotate the flange 61.

Inasmuch as the link 75 is secured against axial movement by its attachment to the flange 69, such rotation of the flange 61 will cause oscillation of the housing portion 18 of the apparatus, the purpose of which will be later described.

For the delivery of compressed air to the annular duct 22 from the accumulator 15, a conduit 78 extends from the accumulator 15 to a point adjacent the forward portion of the vehicle 12 and a flexible hose 79 connects the conduit 78 with a fitting 80, the latter being secured to the rearward wall of the scroll 23 coextensive with an inwardly flared port 81 therein.

In use, the fog penetrating apparatus may be secured as shown in Figs. 1 and 2, to the bumper 11 of a vehicle 12 and, by means of the portion 70 and number 71, be suitably directed normally forwardly and at a suitable angle downwardly, as shown in Fig. 1.

The entire apparatus may not be utilized simultaneously however, when it is desired to penetrate a very dense fog, the compressor 14 will be started to deliver compressed air to the accumulator 15 and, through the conduits 78 and 79, to the scroll 23 wherein the compressed air will be radially distributed and delivered to the annular duct 22. The compressed air will flow through the duct 22 in the direction of the arrows 90 and will have a swirling motion imparted thereto by means of the vanes 50 so that the compressed air leaving the apparatus will initially form a rotating tubular air mass as indicated by the arrows 91.

When the motor 26 is energized, the fan 46 will be driven thus drawing air through the openings 51 and through the inner duct 27 to deliver a flow of air into the central area of the beforementioned tubular air mass, as indicated by the arrows 92. The air flows from the two ducts 22 and 27 will thus mingle to produce a turbulent flow of compressed air which will be directed into the fog and against a highway 93 a short distance in front of the vehicle so as to cause a turbulent movement of the fog.

The motor 26 will also oscillate the housing 18 so as to direct the flow of compressed air back and forth in an arc covering approximately the width of the vehicle, thus also oscillating the lamp and directing the beam therefrom in a similar arc. The apparatus will thus impart movement to static fog enabling the vehicle driver to see a line on the highway, a curb or other highway lane marking.

Through the use of the multicolor fog lamp lenses 37 and 38 and transparent contrastingly colored fan blades 46, a varicolored light beam is produced to enable visual penetration of various densities of fog, such fog being more readily penetrable thereby, inasmuch as it has been found that different colored light sources will have varying effects on the differing fog conditions.

For less dense fog, it may only be necessary to utilize the compressed air from the duct 22 in combination with the lamp 30 with no oscillation, or the air flow from the inner duct 27 in combination with the lamp and oscillation mechanism. For very light fog, the lamp 30 may be utilized independent of the balance of the apparatus.

Having thus described the invention and the present embodiment thereof, it is desired to emphasize the fact that many modifications may be resorted to in a manner limited only by a just interpretation of the following claims.

I claim:

1. A fog penetrating apparatus comprising in combination: a fog lamp secured to a vehicle, the light beam therefrom being directed substantially in the direction of travel of said vehicle; an air compressor; means for driving said compressor; a pair of concentric annular air ducts positioned about said lamp, the outlet therefrom being directed in substantially the same direction as said light beam; air conducting means interconnecting said compressor and the outermost of said concentric annular air ducts; propellant means for moving a separate flow of air through the innermost of said annular air ducts; and independent driving means for said propellant means.

2. A fog penetrating apparatus comprising in combination: a fog lamp secured to a vehicle, the light beam therefrom being directed substantially in the direction of travel of said vehicle; an air compressor; means for driving said compressor; a pair of concentric annular air ducts positioned about said lamp, the outlet therefrom being directed in substantially the same direction as said light beam; air conducting means interconnecting said compressor and the outermost of said annular air ducts; propellant means for moving a separate flow of air through the innermost of said annular air ducts; independent driving means for said propellant means; and means in the outlet of said outermost annular air duct and positioned downstream from the position of said lamp for imparting a swirling motion to the air emitting therefrom.

3. A fog penetrating apparatus comprising in combination: a fog lamp secured to a vehicle, the light beam therefrom being directed substantially in the direction of travel of said vehicle; an air compressor; means for driving said compressor; a pair of concentric annular air ducts positioned about said lamp, the outlet therefrom being directed in substantially the same direction as said light beam; air conducting means interconnecting said compressor and the outermost of said annular air ducts; propellant means for moving a separate flow of air through the innermost of said annular air ducts; driving means for said propellant means; an oscillation mechanism interconnecting said lamp and said annular air ducts with said vehicle; and driving means for said oscillation mechanism.

4. A fog penetrating apparatus comprising in combination: a housing supported on the forward end of a vehicle; a pair of annular concentric air ducts within said housing; a fog lamp axially mounted within said housing and said annular air ducts; an electric motor mounted coaxially with said lamp; a drive shaft extending axially through a bearing in said lamp; a fan operably connected to the end of said shaft and positioned adjacent the lense surface thereof, said fan adapted to propel air through the innermost of said annular ducts; an air compressor; driving means for said compressor; and air conducting means interconnecting said compressor and the outermost of said annular ducts, the outlet for said air from said annular ducts being directed in substantially the same direction as the light beam from said lamp.

5. A fog penetrating apparatus comprising in combination: a housing rotatably supported on the forward end of a vehicle; a pair of annular concentric air ducts within said housing; a fog lamp axially mounted within said housing and said annular air ducts; an electric motor mounted coaxially with said lamp; a drive shaft extending axially through a bearing in said lamp; a fan operably connected to the end of said shaft and positioned adjacent the lense surface thereof, said fan adapted to propel air through the innermost of said annular ducts; an air compressor; driving means for said compressor; air conducting means interconnecting said compressor and the outermost of said annular ducts, the outlet for said air from said annular ducts being directed in substantially the same direction as the light beam from said lamp; and oscillation means driven by said electric motor and adapted to oscillate said housing and said lamp.

6. A fog penetrating apparatus comprising in combination: a housing supported on the forward end of a vehicle; a pair of annular concentric air ducts within said housing; a multicolored fog lamp axially mounted within said housing and said annular air ducts; an electric motor mounted coaxially with said lamp; a drive shaft extending axially through a bearing in said lamp; a transparent colored fan operably connected to the end of said shaft and positioned adjacent the lense surface thereof, said fan adapted to propel air through the innermost of said annular ducts; an air compressor; driving means for said compressor; and air conducting means interconnecting said compressor and the outermost of said annular ducts, the outlet for said air from said annular ducts being directed in substantially the same direction as the light beam from said lamp.

7. A fog penetrating apparatus comprising in combination: a housing rotatably supported on the forward end of a vehicle; a pair of annular concentric air ducts within said housing; a multicolored fog lamp axially mounted within said housing and said annular air ducts; an electric motor mounted coaxially with said lamp; a drive shaft extending axially through a bearing in said lamp; a transparent colored fan operably connected to the end of said shaft and positioned adjacent the lense surface thereof, said fan adapted to propel air through the innermost of said annular ducts; an air compressor; driving means for said compressor; air conducting means interconnecting said compressor and the outermost of said annular ducts, the outlet for said air from said annular ducts being directed in substantially the same direction as the light beam from said lamp; and oscillating means driven by said electric motor and adapted to oscillate said housing and said lamp.

8. A fog penetrating apparatus comprising in combination: a housing supported on the forward end of a vehicle; a pair of annular concentric air ducts within said housing; a fog lamp axially mounted within said housing and said annular air ducts; an electric motor mounted coaxially with said lamp; a drive shaft extending axially through a bearing in said lamp; a fan operably connected to the end of said shaft and positioned adjacent the lense surface thereof, said fan adapted to propel air through the innermost of said annular ducts; an air compressor; driving means for said compressor; air conducting means interconnecting said compressor and the outermost of said annular ducts, the outlet for said air from said annular ducts being directed in substantially the same direction as the light beam from said lamp; and means in the outlet of said outermost annular air duct for imparting a swirling motion to the air emitting therefrom.

9. A fog penetrating apparatus comprising in combination: a housing rotatably supported on the forward end of a vehicle; a pair of annular concentric air ducts within said housing; a multicolored fog lamp axially mounted within said housing and said annular air ducts; an electric motor mounted coaxially with said lamp; a drive shaft extending axially through a bearing in said lamp; a transparent colored fan operably connected to the end of said shaft and positioned adjacent the lense surface thereof, said fan adapted to propel air through the innermost of said annular ducts; an air compressor; driving means for said compressor; air conducting means interconnecting said compressor and the outermost of said annular ducts, the outlet for said air from said annular ducts being directed in substantially the same direction as the light beam from said lamp; means in the outlet of said outermost annular air duct for imparting a swirling motion to the air emitting therefrom; and oscillation means driven by said electric motor and adapted to oscillate said housing and said lamp.

References Cited in the file of this patent

UNITED STATES PATENTS

| | | |
|---|---|---|
| 1,478,148 | Trejo M et al. | Dec. 18, 1923 |
| 1,608,998 | Riiho | Nov. 30, 1926 |
| 1,742,116 | Wright | Dec. 31, 1929 |
| 1,934,998 | Stahlknecht | Nov. 14, 1933 |
| 2,446,333 | Kennedy | Aug. 3, 1948 |

FOREIGN PATENTS

| | | |
|---|---|---|
| 2,327 | Denmark | June 17, 1899 |